US009031605B2

(12) United States Patent
Czaja et al.

(10) Patent No.: US 9,031,605 B2
(45) Date of Patent: May 12, 2015

(54) MOBILE FEMTO-CELL IN A WIRELESS SAFETY NETWORK

(75) Inventors: Stanislaw Czaja, Cardiff, CA (US); Muhammad Afsar, San Diego, CA (US)

(73) Assignee: IPCOMM, Cardiff, CA (US)

( * ) Notice: Subject to any disclaimer, the term of this patent is extended or adjusted under 35 U.S.C. 154(b) by 118 days.

(21) Appl. No.: 13/039,477

(22) Filed: Mar. 3, 2011

(65) Prior Publication Data

US 2011/0217947 A1    Sep. 8, 2011

Related U.S. Application Data

(60) Provisional application No. 61/310,553, filed on Mar. 4, 2010.

(51) Int. Cl.
| | | |
|---|---|---|
| H04M 11/04 | (2006.01) | |
| H04M 1/725 | (2006.01) | |
| H04W 72/04 | (2009.01) | |
| H04W 84/00 | (2009.01) | |
| H04W 84/10 | (2009.01) | |

(52) U.S. Cl.
CPC ............ *H04M 11/045* (2013.01); *H04M 11/04* (2013.01); *H04M 1/72577* (2013.01); *H04W 72/04* (2013.01); *H04W 84/005* (2013.01); *H04W 84/10* (2013.01)

(58) Field of Classification Search
CPC ............ H04M 11/04; H04M 1/72577; H04M 11/045; H04W 72/04; H04W 16/24–16/32; H04W 84/04–84/045
USPC ........................................................ 455/444
See application file for complete search history.

(56) References Cited

U.S. PATENT DOCUMENTS

| | | | | |
|---|---|---|---|---|
| 5,278,991 | A * | 1/1994 | Ramsdale et al. | 455/444 |
| 5,603,080 | A * | 2/1997 | Kallander et al. | 455/14 |
| 6,771,673 | B1 * | 8/2004 | Baum et al. | 370/535 |
| 7,145,890 | B1 * | 12/2006 | Seo et al. | 370/331 |
| 7,221,904 | B1 * | 5/2007 | Gavrilovich | 455/11.1 |
| 8,160,589 | B2 * | 4/2012 | Kuwahara | 455/440 |
| 8,279,838 | B2 * | 10/2012 | Chou et al. | 370/332 |
| 2002/0057661 | A1 * | 5/2002 | Raith | 370/337 |
| 2004/0028015 | A1 * | 2/2004 | Fouilland et al. | 370/337 |
| 2005/0085257 | A1 * | 4/2005 | Laird et al. | 455/550.1 |
| 2006/0229104 | A1 * | 10/2006 | de La Chapelle et al. | 455/562.1 |
| 2009/0005045 | A1 * | 1/2009 | Kuriki et al. | 455/436 |
| 2009/0312017 | A1 * | 12/2009 | Grob et al. | 455/434 |
| 2010/0061339 | A1 * | 3/2010 | Kim et al. | 370/331 |
| 2010/0080323 | A1 * | 4/2010 | Mueck et al. | 375/296 |
| 2010/0135248 | A1 * | 6/2010 | Aramaki et al. | 370/331 |
| 2010/0144355 | A1 * | 6/2010 | Jin et al. | 455/444 |
| 2010/0234071 | A1 * | 9/2010 | Shabtay et al. | 455/562.1 |
| 2010/0238932 | A1 * | 9/2010 | Kliger et al. | 370/392 |
| 2010/0242103 | A1 * | 9/2010 | Richardson et al. | 726/7 |
| 2010/0273509 | A1 * | 10/2010 | Sweeney et al. | 455/456.3 |
| 2010/0278141 | A1 * | 11/2010 | Choi-Grogan et al. | 370/331 |
| 2010/0291897 | A1 * | 11/2010 | Ghai | 455/410 |
| 2011/0237251 | A1 * | 9/2011 | Chow et al. | 455/434 |

(Continued)

*Primary Examiner* — Mehmood B Khan

(57) ABSTRACT

This invention provides wireless safety network through the integration of mobile femto-cells (mFAP), into macro-cellular system. Such network provides safety management for students during their travel to and from school through the supervision of handovers between home and mobile femto-cell and the macro-cellular environment as well as supervision of class attendance, emergency function, and other services.

7 Claims, 8 Drawing Sheets

(56) References Cited

U.S. PATENT DOCUMENTS

| | | | |
|---|---|---|---|
| 2011/0243085 A1* | 10/2011 | Seo et al. | 370/329 |
| 2012/0020293 A1* | 1/2012 | Nix et al. | 370/328 |
| 2012/0039213 A1* | 2/2012 | Cheng et al. | 370/254 |
| 2012/0231797 A1* | 9/2012 | Van Phan et al. | 455/437 |
| 2012/0238273 A1* | 9/2012 | Lim et al. | 455/436 |
| 2012/0315916 A1* | 12/2012 | Van Phan et al. | 455/442 |

* cited by examiner

MOBILE FEMTO-CELL IN A WIRELESS SAFETY NETWORK

PRIORITY INFORMATION

This application claims the benefit of priority of U.S. provisional application Ser. No. 61/310,553 titled "Femto-cell Handoffs and a Method for Controlling Student Security Networks, Green-home Functionality, Home Health Delivery and Enterprise Traffic Routing" filed Mar. 4, 2010, whose inventor is Stanislaw Czaja, which is hereby incorporated by reference in its entirety as though fully and completely set forth herein.

FIELD OF THE INVENTION

The following disclosure relates generally to wireless communication, and more specifically to the wireless safety network based on the concept of mobile femto-cell and handovers between the femto-cell and the macro-cellular. Such system may be used by a school, or school district for the management of students secure passage on their trip to/from school, maintain students presence/absence in classes as well as other services.

BACKGROUND

Wireless communication systems are widely deployed to provide various types of communication content such as voice, data, and so on. Such wireless communication system provides simultaneous support for multiple wireless terminals communicating with one or more base stations. Examples of such multiple-access systems include code division multiple access (CDMA) systems, time division multiple access (TDMA) systems, frequency division multiple access (FDMA) systems, and orthogonal frequency division multiple access (OFDMA) systems.

In addition to wireless networks currently in place, a new class of small base stations generally known as femto-cells, or femto-call access point, or home node B units (HNBs), or home-evolved eNode B units (HeNBs) has emerged.

Femto-call access point (FAP) base station transmit signal at low power levels and is intended for personal use to enhance indoor/outdoor coverage and quality of service (QoS) within the private home, public or corporate premises. Typical FAP has two main interfaces: 1) wireless interface in the licensed part of the spectrum (cellular) to provide local service within the home; 2) fixed, wire (DSL, Cable, etc) interface to the service provider network over Internet.

The techniques described herein can be used for various wireless communication systems such as code division multiple access (CDMA), time division multiple access (TDMA), frequency division multiple access (FDMA), orthogonal FDMA (OFDMA), SC-FDMA (single carrier FDMA) and other systems. The terms "system" and "network" are often used interchangeably. A CDMA system can implement a radio technology such as Universal Terrestrial Radio Access (UTRA), CDMA2000, etc. A TDMA system can implement a radio technology such as Global System for Mobile Communications (GSM). An OFDMA system can implement a radio technology such as Evolved UTRA (E-UTRA), IEEE 802.11 (Wi-Fi), IEEE 802.16 (WiMAX), etc.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present invention provides wireless safety network based on the concept of mobile femto-cell (mFAP), integrated with the macro-cellular network and one or more conventional home femto-cells (HNBs. Such system provides for the management of students safety during their travel to/from school by integrating mFAP into school busses and integrating such mFAPs with the central control system residing in the femto-cell gateway (HNB-GW) located in the school, a wireless cellular network, and one or more home based femto-cells (HNBs). By using handover mechanism integral to the cellular system such network provides virtual supervision of the student passage between his/her home and the school. In addition, such system maintains students class schedules, their presence/absence in classes, provides travel/class schedule alerts, emergency functions as well as providing restricted services during the class by blocking all incoming and outgoing calls—except emergency call to the student population wireless terminals in attempt to provide quiet and uninterrupted learning experience.

While the conventional FAP is connected to the Internet and subsequently to the wireless service provider over the fixed network (DSL, Cable), the mFAP is connected to wireless service provider over the second wireless link. This second wireless link may be a different RF channel of the same technology as one serving the primary access interface or by another wireless technology. Beside providing dedicated services to mobile users (trains, busses, etc) mFAP increase the macro-cell capacity quality of service (QoS) by aggregating traffic of multiple local users into multi-user packets does increasing in coding gain, avoiding allocation of multiple channels in CDMA systems, or avoiding fragmentation of transmission resources in OFDMA systems, as well as avoiding collisions in the uplink transmission.

In addition to mFAP the wireless safety network comprises of one or more HNB, one of them Home NodeB Gateway (HNB-GW), preferably located at the school premises performs and the Control Node Entity. The Control Node Entity performs mobility management function, and may be co-located with the HNB-GW or reside on a separate HW platform.

One of the use of wireless safety network is to provide student's safety during daily travel to/from school. In such embodiment, the mFAP is installed in the school bus to supervise the presence of the student terminals included in it's mobile Closed Subscriber Group (mCSG) list in the mFAP local coverage area. The mCSG is maintained by the Control Node entity. When the terminal associated with the mCSG performs HO from the macro-cell to the mFAP, the mFAP sends a *Status Update Message* to the Control Node entity with the student ID attendance indicator. In addition, mFAP provides wireless services to the terminals associated with it's mCSG list and being within it's coverage area over it's wireless backhaul.

In such application, the Control Node entity maintains the list of all students, their class schedules, home addresses, bus routes schedules and IP addresses of the *Remote Nodes* (student's home femto-cell or wireless terminal) and student's wireless terminals IDs. Based on such information, Control Node entity populates the mCSG lists for each mFAP.

The mCSG list is maintained by the mobility management (MM) function located in Control Node entity, which updates the mFAP mCSG list with the IDs of the wireless terminals associated with this mFAP route. In addition to student terminal ID, the mCSG list is populated with the mFAP route stop number and location, or time, this particular terminal is expected to perform handover (HO) from the macro-cell to the mFAP.

During the mFAP scheduled route, the Control Node entity sends Alert Message to the student's Remote Node, reminding about the school bus arrival time. In response to the Alert Message, the Remote Node sends a Status Update Message indicating student current status. In response to receiving such status, the Control Node entity updates it's status registry and the status registry of the related mCSG.

When the student wireless terminal performs HO from the HNB to the macro-cell, the Remote Node sends a Status Update Message indicating that the student left it's coverage area. In response to receiving such status, the Control Node entity updates it's status registry and the status registry of the related mCSG.

After bus arrives at the school, each student's wireless terminal performs HO from mFAP to the Control Node entity (this HO may be direct from the mFAP to the school HNB-GW, or indirectly through the HO to macro-call and then to the school HNB). In response to such HOs, the Control Node entity updates it's registry and sends Status Update Message to each Remote Node indicating student's safe arrival.

In case, any of the scheduled HOs (home to macro; macro to mFAP; mFAP to school), does not occur, the Control Node entity enters the Alarm State, in which it performs notification procedures according to the student individual settings. Such procedures may involve one or all of the following: sending of the Alert Message to the student HNB in response to which this HNB performs set of preprogrammed emergency steps, or sending a SMS alert messages to the student's parent wireless terminal, or initiate E911 procedure.

DESCRIPTION OF THE RELATED ART

Several methods to provide a mobile and stationary wireless access point (AP) are currently deployed. the most common is a WiFi access point. Also WiFi can provide localized wireless services and may be installed in a mobile environment, such as airplanes, trains, etc. However, since WiFi and other similar technologies can't perform supervised handovers of services to/from wireless MAN (cellular) systems. Even if the WiFi access point (AP), is integrated with the wireless MAN network, for example a hot-spot operated by the same service provider, the service between the wireless MAN and the hot-spot can not be moved dynamically—through the handover, but must be reconnected manually by the user action.

BRIEF DESCRIPTION OF THE DRAWINGS

A better understanding of the present invention can be obtained when the following detailed description of the preferred embodiment is considered in conjunction with the following drawings, in which.

Figure 1:
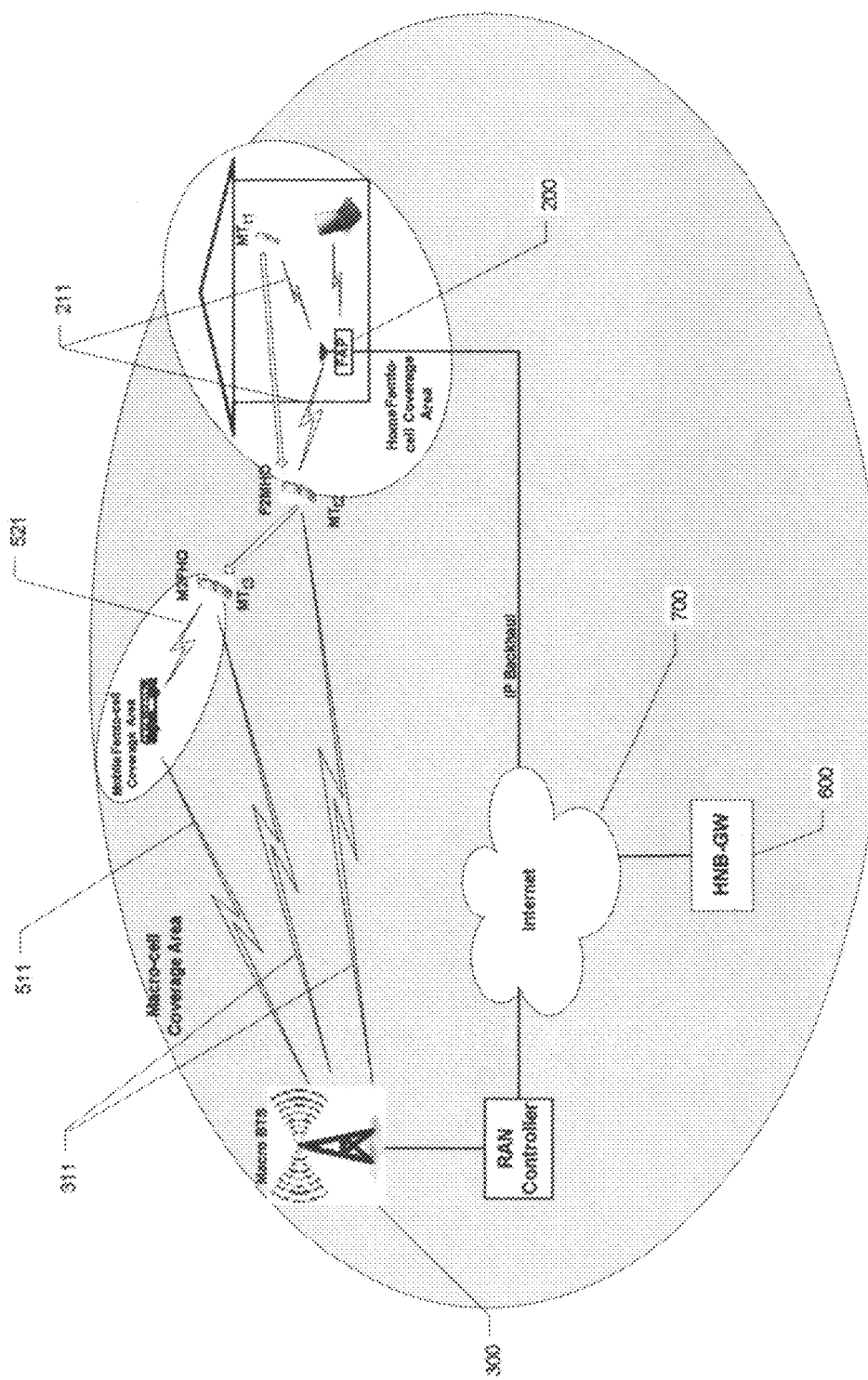
FIG. 1 presents Wireless Safety Network architecture.

While the invention is susceptible to various modifications and alternative forms, specific embodiments thereof are shown by way of example in the drawings and are herein described in detail. It should be understood, however, that the drawings and detailed description therefore are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, etc.; or a non-volatile memory such as a magnetic media, e.g., a hard drive, or optical storage. The memory medium may comprise other types of memory as well, or combinations thereof. In addition, the memory medium may be located in a first processor in which the programs are executed, or may be located in a second different processor which connects to the first processor over a network, such as wireless PAN or WMAN network or the Internet. In the latter instance, the second processor may provide program instructions to the first processor for execution. The term "memory medium" may include two or more memory mediums which may reside in different locations, e.g., in different processors that are connected over a network.

Application—the term "application" is intended to have the full breadth of its ordinary meaning. The term "application" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Visual C, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including mobile terminal, personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Terminal—in the scope of this invention any wireless MAN enabled terminal such as cell-phone, etc.

mFAP and mHNB—hereinafter referred to collectively as mFAP, and in the context of this invention refers to a mobile femto-cell installed on school bus. Mobile FAP primary air interface supports the communication with the wireless terminals and may support multiple wireless technologies, such as: GSM, cdma2000, UMTS, LTE, etc, while it's secondary air interface is used to communicate with the service provider wireless network.

mFAP Primary RF Interface—the wireless RF interface used to downlink and uplink communication to the mobile terminals when such terminals are within the mFAP coverage area.

mFAP Secondary RF Interface—the wireless RF interface used to downlink and uplink communication between the mFAP and wireless service provider RAN.

HNB or HeNB—hereinafter referred to collectively as HNB is the home femto-cell equipment.

Control Node (CN)—in the context of this invention, central entity managing the wireless safety network.

Home Node (HN)—in the scope of this invention control function, which resides in the user home femto-cell (HNB) or his/hers wireless terminal.

Mobile Node—(MN)—in the scope of this invention control function, which resides in mFAP (mHNB).

Mobility Management (MM)—in the scope of this invention, function residing in the Control Node entity responsible for the maintenance of control, home and mobile nodes registry.

mCSG—in the context of this invention list containing mobile FAP Closed Subscriber Group IDs assigned by the SMM.

Control Node Registry (CNR)—in the context of this invention, registry within MM containing the IDs of all Closed Subscriber Groups.

Home Node Registry (HNR)—in the context of this invention, registry within the MM containing IDs of all HNBs and the IDs of all wireless terminals associated with Control Node entity.

Mobile Node Registry (MNR)—in the context of this invention, registry within the MM containing IDs of the wireless terminal assigned to a particular mCSG.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". Furthermore, the names used to describe various massages passing through the system are for example only.

Description of Preferred Embodiment

This method leverages the functionality of handovers between the macro-cellular environment and the femto-cell (FAP), one of which is a mobile femto-cell (mFAP). Such integrated system provides student safety and mobility management allowing a virtual supervision of student's safety during their travel to/from school. In addition, such system provides management of student's class and transportation schedules, supervision of their attendance and the management of restricted communication—by allowing only emergency calls during the class period.

The proposed system integrates the school based femto-cell (HNB or HNB-GW), performing the control function during the time student leaves his/her home and during the school period, with the student's home femto-cells (HNBs), performing local service functions and the mobile femto-cells (mFAPs) supervising the students scheduled transition between the W-MAN environment and the school bus.

The mFAP, unlike conventional FAP (HMB) supports two RF interfaces: primary RF interface is similar to the conventional FAP and designated to provide local service within the mFAP coverage area, for example school bus and it's immediate vicinity; secondary RF interface, to provide communication with the service provider Radio Access Network (RAN) infrastructure. As such the mFAP communication with the service provider network is not routed over the fixed-line internet but over another RF channel using same or different radio access technology as the primary RF interface.

In addition to providing dedicated services to mobile users, on it's secondary RF interface mFAP may aggregate traffic of multiple users into multi-user packets. Such aggregation will increase the system performance and capacity by increasing coding gain, avoiding allocation of multiple channels, avoiding fragmentation of transmission resources and collisions from multiple users in the uplink transmission.

An example of such system is presented in FIG. 1. Here, at time t1 the mobile terminal is within the coverage area of student's home femto-cell (HNB), and communicates with the Home Node HNB 200 over local RF link 211, receives an alert message from the school based Control Node 600 about the school buss scheduled arrival time.

When at time t2, the student's wireless terminal performs a handover from the femto-cell 200 coverage area to the macro-cell 300 coverage area referred as femto-to-macro handoff (F2 MHO), the Control Node 600 receives the handoff completion notification and after updating it's students mobile registry, sends an student update status to the school bus installed mobile femto-cell (mFAP).

After the F2 MHO, the student's mobile terminal communicates with the macro-cell base station 300 over the RF link 311. During this time, the Control Node 600 tracks the student location using the wireless network location based service (LBS), and/or monitor location of the mFAP and it's arrival time to the scheduled bus stop than monitor the status of the student's mobile terminal handoff.

When at time t3, the student mobile terminal performs macro-to-femto (M2FHO) handover to the arriving school bus femto cell using primary RF interface 521, the Mobile Node 500 sends student status update to the Control Node 600, using it's secondary RF interface 511 and macro-cell BS 300. In effect, the Mobile Node will update the status on the HNB IP backhaul connection to the Internet 700.

After the M2FHO is completed, the communication for the student's mobile terminal is provided by the mFAP secondary RF interface 511. To increase the efficiency of the this link, an aggregation of individual users uplink and downlink communication into multi-user packets may be provided by the Mobile Node application or mFAP media access layer (MAC).

When the mFAP arrives at the school, student's mobile terminals perform handover to the Control Node 600, either directly as femto-to-femto handover (F2FHO) or indirectly (if the coverage area of the Control Node 600 is limited), as F2 MHO followed by M2FHO. After this last handover is completed, all of the student's mobile terminals are under the control of Control Node femto-cell.

The Control Node 600, monitors students presence by monitoring handovers from/to macro-cell environment, maintains student's class schedule and provides all wireless communication from/to student's mobile terminals. By maintaining school scheduled periods and individual student's class assignment, the Control Node, can provide "Quiet Class Periods"—periods during which only incoming and outgoing emergency call (E911 and predefined personal emergencies) are routed through the HNB-GW backhaul interface.

Figure 2:
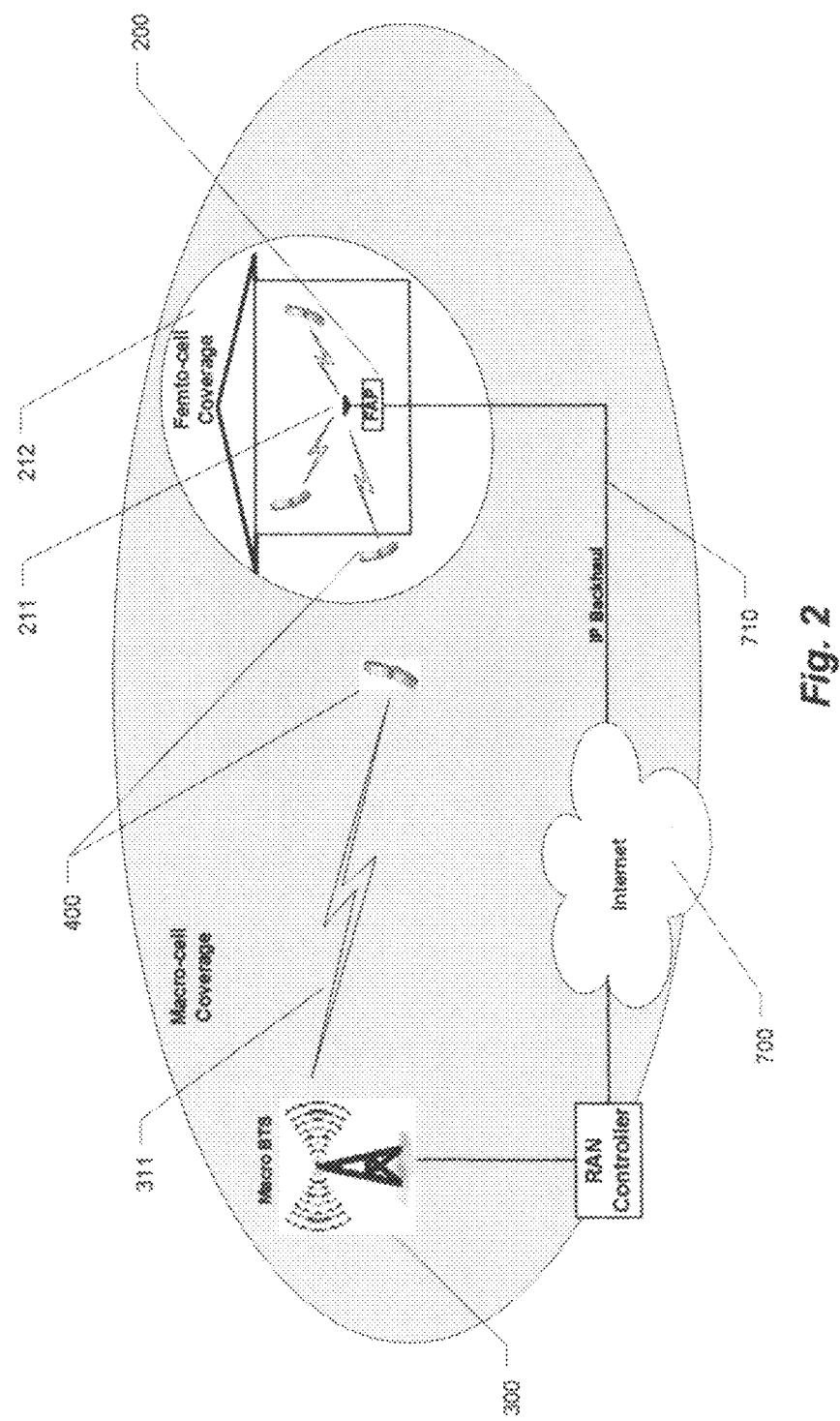
FIG. 2 presents the home femto-cell (HNB)

FIG. 2 describes the typical architecture of the HNB which is the host of Home Node application including a set of functions designed to communicate with the Control Node, provide authentication to the student home supervisory procedures and provide list of emergency procedures and phone and IP addresses.

Typical deployment of HNB presented in FIG. 2 indicates it's primary functionality—to provide localized wireless services within the user home. It can be seen that when the wireless terminal 400 is outside of the HNB coverage area it is serviced by the macro-cell base station 300 over the RF interface 311. However, when the wireless terminal 400 is within the coverage of the HNB 212, it is serviced by the femto-cell RF interface 211, and the traffic is routed over the HNB fix-line interface 710 and Internet network 700 to the service provider core network.

Figure 6:
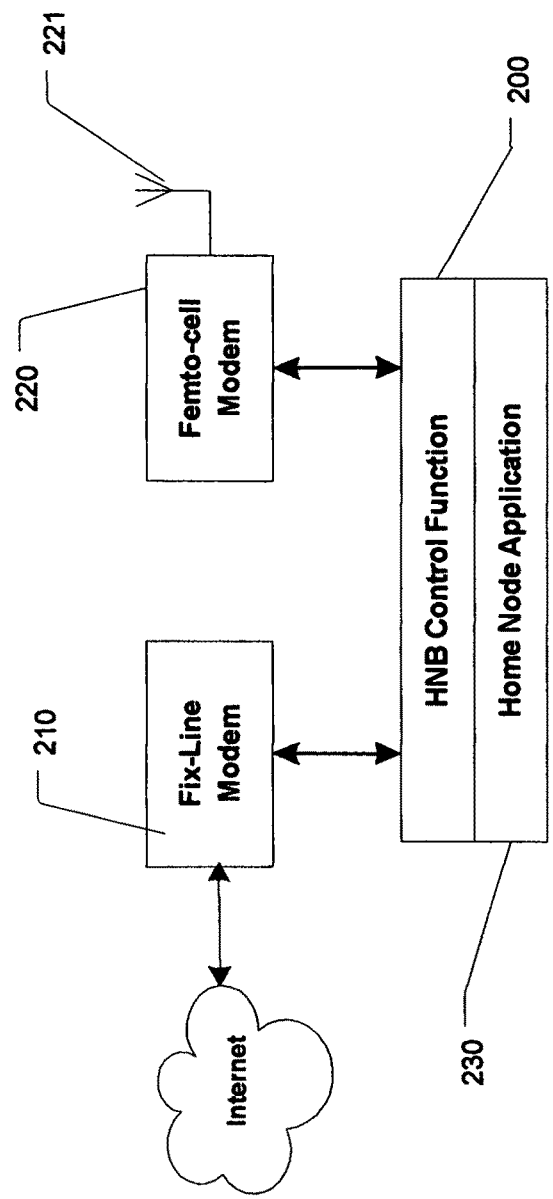
FIG. 6 is an exemplary block diagram of the Home Node.

The Home Node application residing in the HNB provides a set of procedures designed to communicate with the Control Node over the HNB interface 710 as well as a means to authenticate the authorized supervisor of Home Node functionality. The exemplary architecture of Home Node is presented in FIG. 6.

Figure 3:
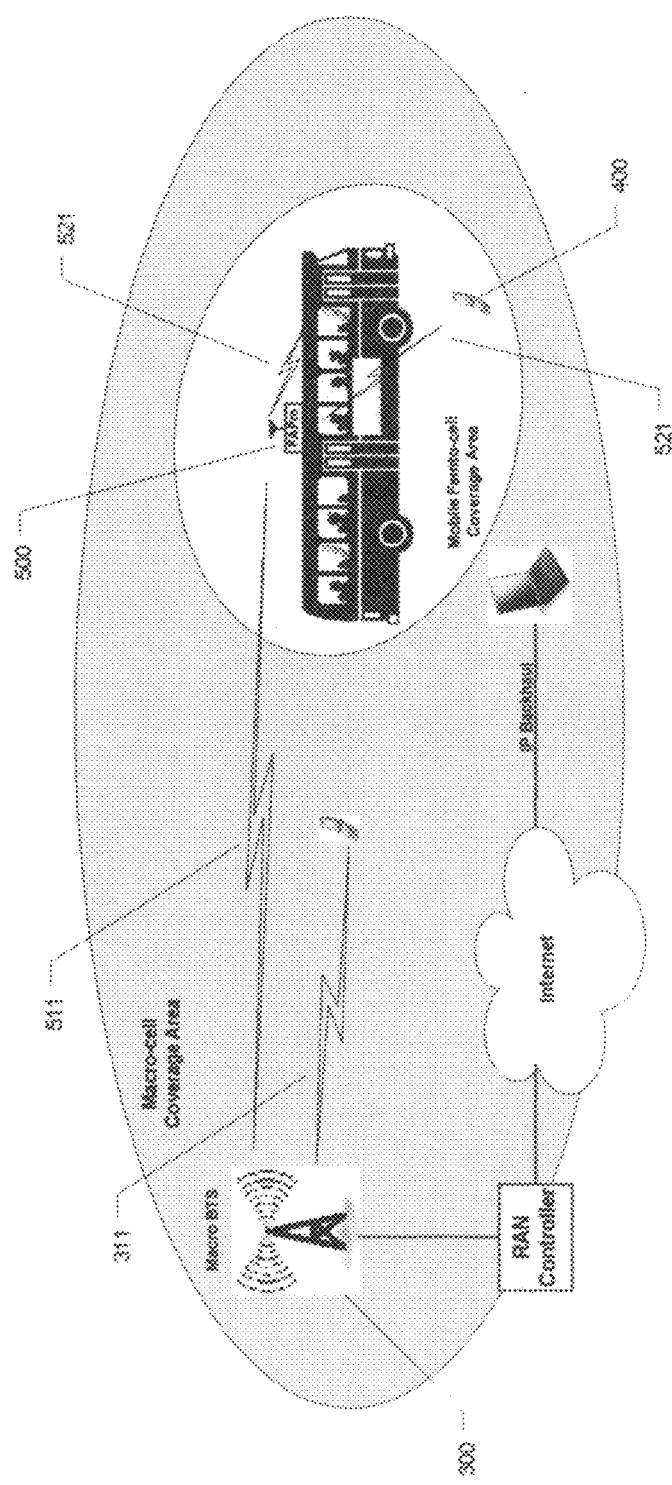
FIG. 3 presents general concept of Mobile Femto-cell Access Point (mFAP)

FIG. 3 presents exemplary architecture of the mobile femto-cell (mFAP) in a macro-cellular system. Here we see that when the wireless terminal 400 is outside of the mFAP local coverage area it communicates with the "outside" world over the macro-cell base station primary RF interface 311. However, when the wireless terminal is in the coverage of the mobile femto-cell (mFAP) 500 located in this case in the school bus, it communicates locally over the mFAP primary RF interface 521, but it's traffic is routed to the service provider network over the mFAP secondary RF interface 511.

Figure 4:
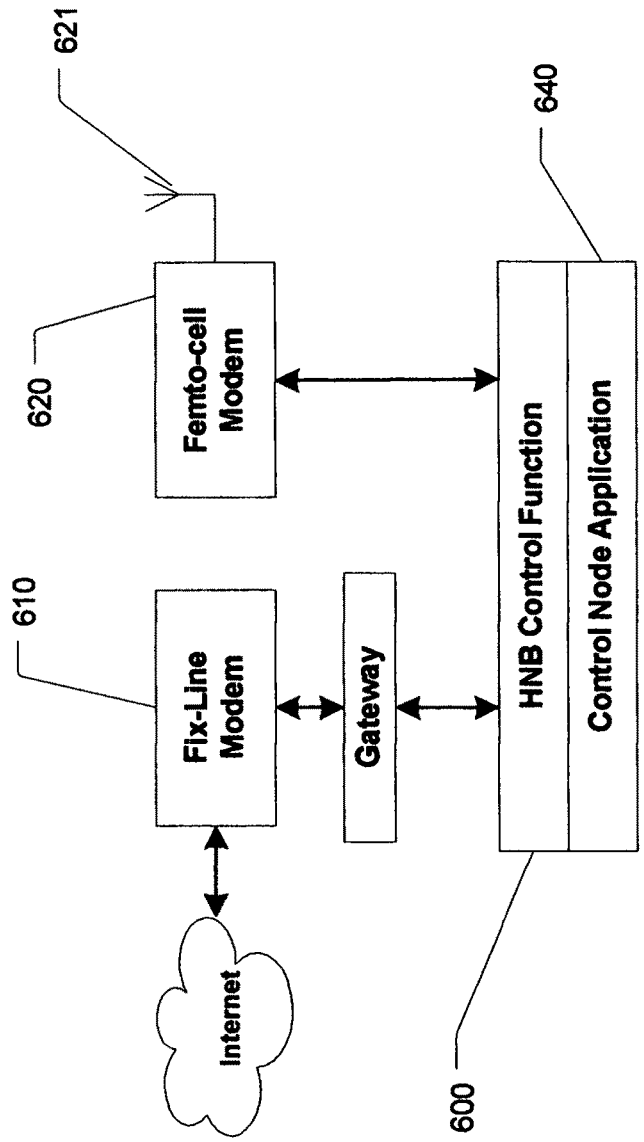
FIG. 4 is an exemplary block diagram of the Control Node.

An exemplary architecture of Control Node is presented in FIG. 4. Here the HNB 600 provides local communication to the school students community using wireless modem 620 and it's RF interface 621, while routing all incoming and outgoing traffic to the service provider core network over it's fixed line connection 610 and the Internet.

Figure 5:
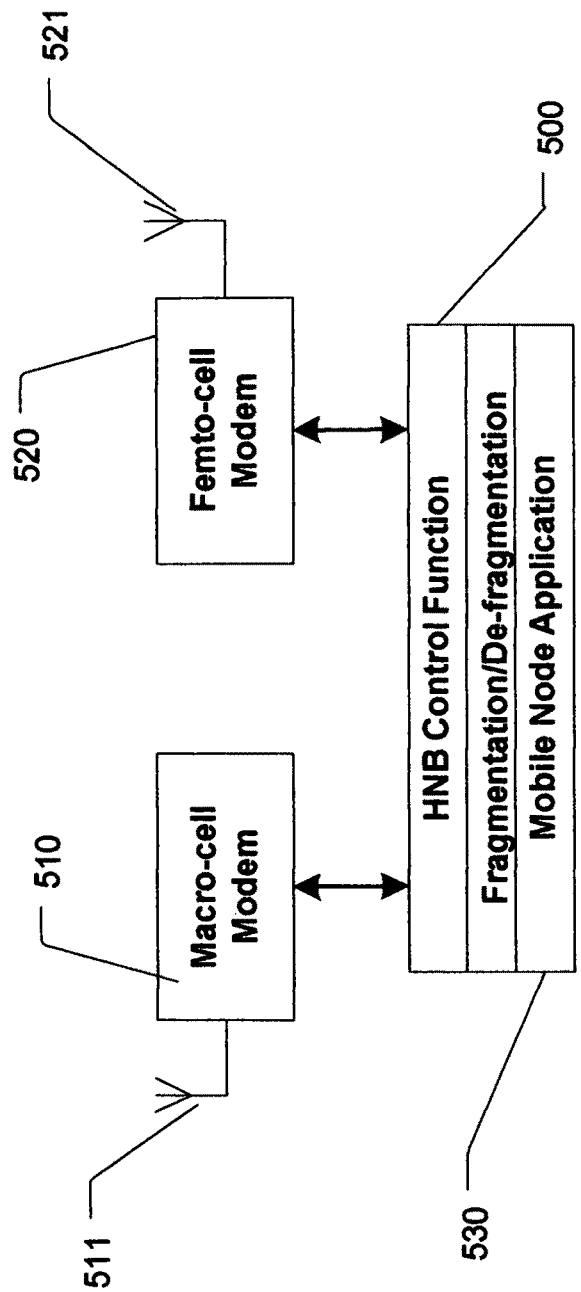
FIG. 5 is an exemplary block diagram of the mFAP.

An exemplary architecture of Mobile Node is presented in FIG. 5. The Mobile Node is an application 530 residing within the mobile femto-cell (mFAP). While the local communication within the coverage area of mFAP is provided in a similar fashion as in case of a conventional HNB, the routing of this local traffic to the service provider core network is over a secondary wireless interface 511. As such, the mFAP can provided localized wireless services in a moving vehicles.

The Mobile Node application provides set of control functions and procedures intended to manage the school bus scheduled rout and students presence through the supervision of M2FHO and F2 MHO.

Figure 7:
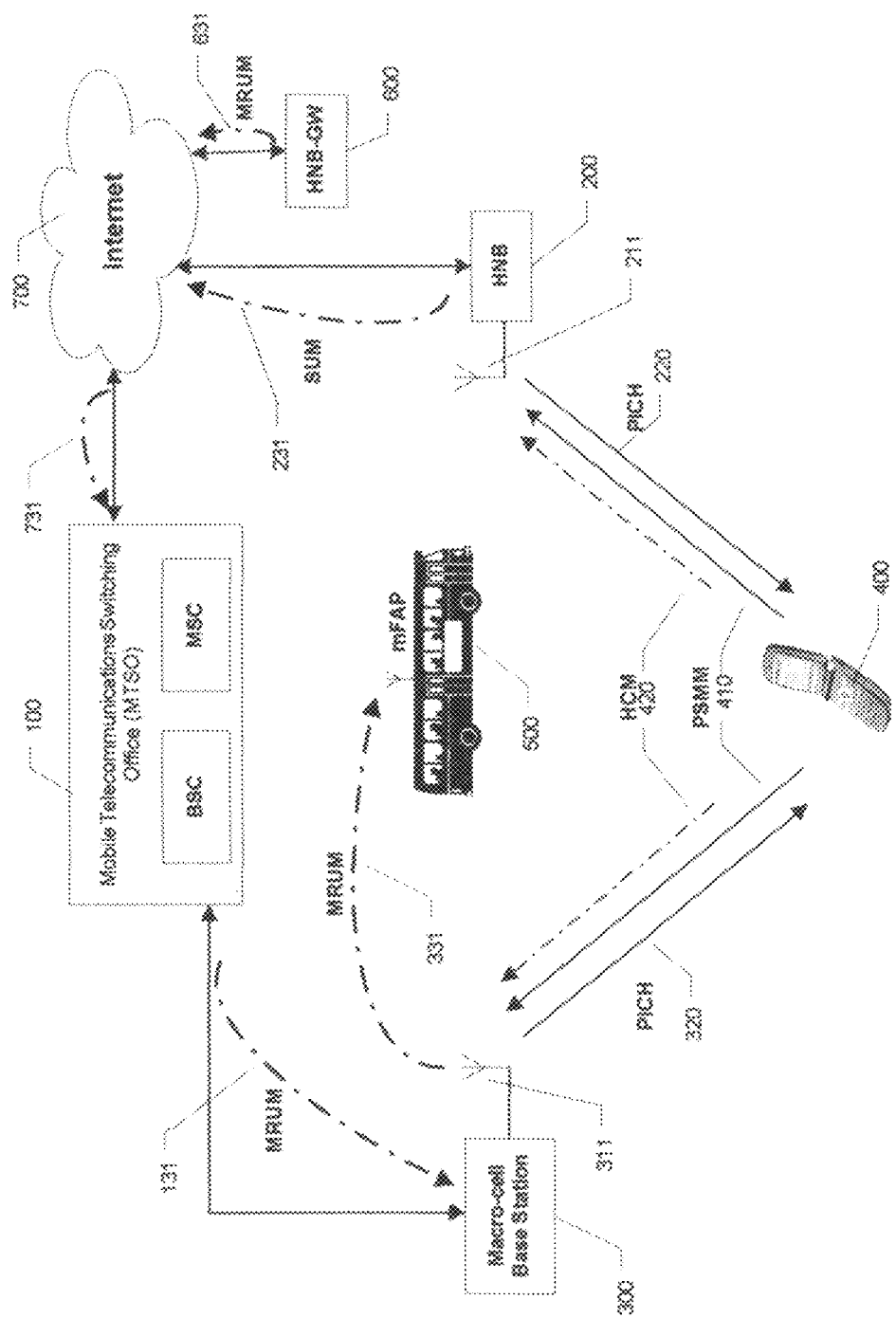
FIG. 7 presents operations and message flow between the Control Node Entity, mFAP and HNB during Femto-to-macro handovers.
Figure 8:
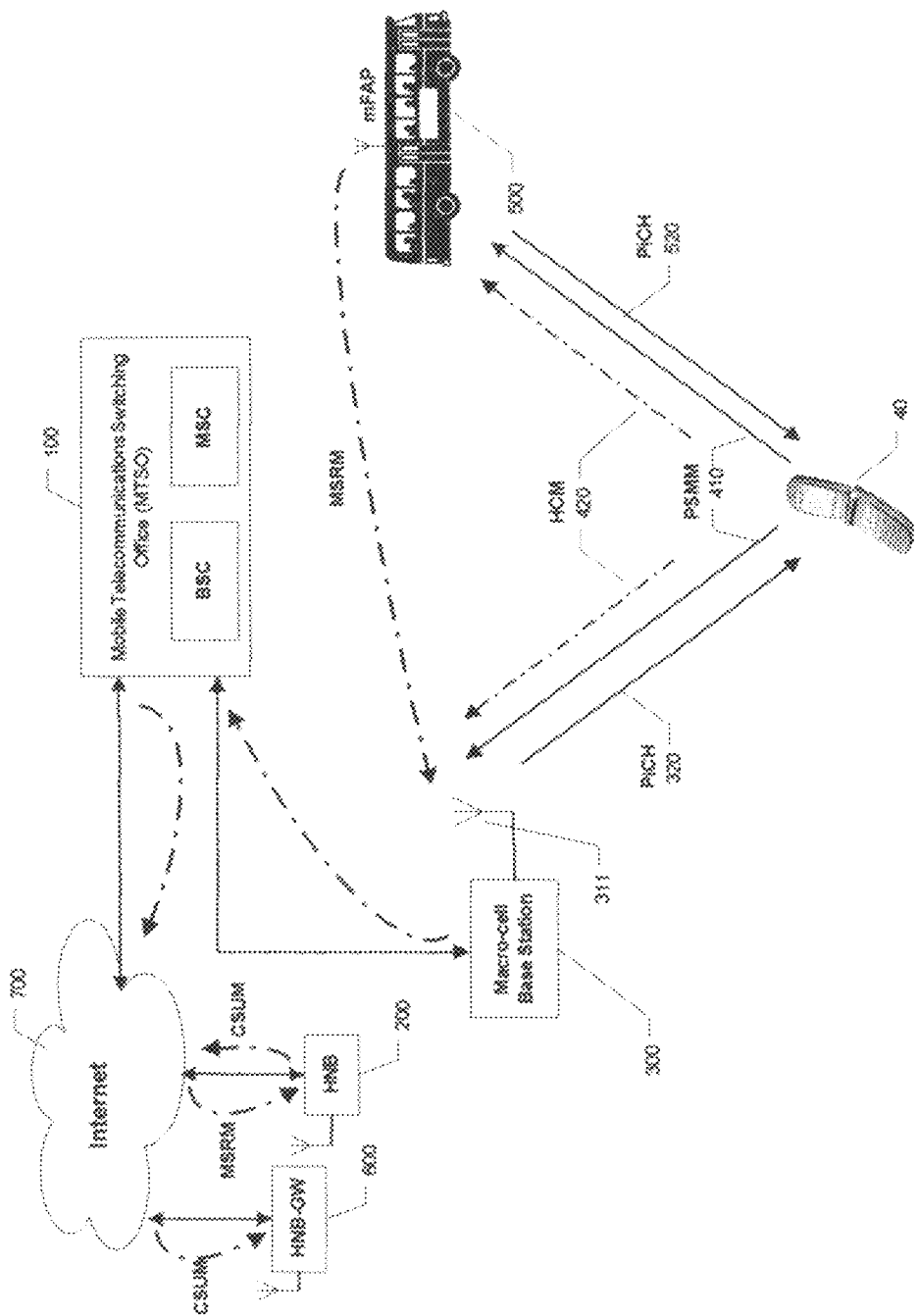
FIG. 8 presents operations and message flow between the Control Node Entity, mFAP and HNB during macro-to-mFAP handovers.

The operation of the student safety system during the F2 MHO (when student leaves his/her home) is presented in FIG. 7. Here, the mobile terminal 400 continuously monitors the strength the Pilot Channel (PiCH), 220 from the serving femto-cell 200 and the strength of the PiCH 320 of the macro-cell base station then sends those measurements in a measurement message, such as Pilot Strength Measurement Message 410. Such obtained measurements are compared with the predefined thresholds designed to determine the boundary of the femto-cell coverage area. When the PiCH signal 320 is above such predefined threshold and the PiCH signal 220 is below such predefined threshold, a channel resources are allocated at the macro-cell base station 300 and message instructing to perform "hand-over" (such as adding the macro-cell 300 to the Active Set, etc.) is sent to the mobile terminal. In response, the mobile terminal 400 sends a handover complete message 420.

The HCM 420 is received both by the macro-cell BS 300 and by the HNB 200, indicating the completion of the handover—now the service to this mobile terminal is provided by the macro-cell 300 and the Mobile Switching Center updates all it's appropriate registry.

In case that the scheduled handoffs did not occur, the Control Node, sends an Alert Request to the specific Home Node IP address, in response to which the Home Node performs it's predefined Absence Alert functions. If the conditions due which the scheduled handover didn't occur, for example: student stays home with parental permission, etc, the Home Node sends the Alert Cancel Message to the Control Node. However, if the Alert Cancel Message is not received within the specified period of time, Control Node enters the Alarm procedures.

When the HNB receives the HCM 420, it passes it as a status to the Home Node, which in turn generates the Status Update Message 231, which includes the Home Node ID, Student Terminal ID, and Status and sends it to the Control Node 600 IP address.

The information from the Status Update Message sent by the Home Node is used by the Control Node resident Mobility Management (MM), registry. After the registry updates, the Control Node 600 sends the Mobile Registry Update Message (MRUM) 631 to the Mobile Node IP address managed by core network 100. The core network mobility management functions selects the macro-cell BS 300 which currently services the mFAP with the IP address included in the MRUM 631 and sends it to the macro-cell BS 300 which in turn sends it in as an air-interface message 331 to the mFAP 500. The MRUM is passed to the Mobile Node application 530 which updates it's mobile Closed Subscriber Group IDs (mCSG) and the Mobile Node Registry with the parameters contained in the MMUM message, such as: students mobile terminal IDs, and their scheduled pick-up stop, or absence/presence flags, etc.

FIG. 7 presents an exemplary procedures when the mFAP 500 arrives at each scheduled bus stop. At this time the Mobile Node retrieves list of all mobile terminals scheduled for this particular boarding, then waits for the conformation of successful handover.

When the student's mobile terminal 400 is within the coverage area of the mobile femto-cell, the mFAP PiCH signal strength reported in PSMM message exceeds the predefined M2FAP threshold and the MSC directs the mobile terminal and the mFAP 400 to perform handover. Upon completion of such handover, the mobile terminal 400, sends Handoff Complete Message (HCM) 420.

The HCM with terminal IDs is passed from the mFAP to the Mobile Node 500, which updates it's Mobile Node Registry, then sends the Status Update Message, to the Control Node IP address using it's RF interface 511 to the macro-cell BS 300. For the Status Update Message, the Mobile Node sets the "PRESENCE" flag to "ON" for each terminal with successful handover and sets the "PRESENCE" flag to "OFF" for each terminal with unsuccessful handover. The Status Update Message is passed to the service provider core network from where it is routed to the Control Node IP address.

Upon receiving the Status Update Message, the Control Node updates the Control Node Registry and for each terminal ID with the "PRESENCE" flag set to "OFF", sends an Alert Request message to the specific Home Node IP address, then waits for the then waits for the Alert Cancel Message.

However, if the Alert Cancel Message is not received within the specified period of time, Control Node enters the Alarm procedures.

Upon receiving Alert Request message from the Control Node, the Home Node performs it predefined Absence Alert functions. If the conditions due which the scheduled handover didn't occur, for example: student returns home with parental permission, etc, the Home Node sends the Alert Cancel Message to the Control Node.

The proper operation of this exemplary system enabled by control mechanism build into it's various components and by providing this control mechanism with specific information.

After the mFAP arrives at the school, it sends a Route Update Message the Control Node which includes the list of all mobile terminals IDs and their status. The Route Update Message may be send over the mFAP secondary RF interface (via macro-cell BS and service provider network) or in case femto-to-femto handover (F2FHO) was executed—the mFAP and HNB-GW coverage areas overlaps, directly to the Control Node.

Now the Control Node updates it's registry and assigns each individual student's mobile terminal to one or several Closed Subscriber Group (CSG), according to his/her individual class schedule. If the Control Node is equipped with location based service (LBS) it may in addition send alert messages to the student mobile terminal in case he/she is out of the class area when the instruction is about to start.

Furthermore, when the student's mobile device is registered with the Control Node, any direct communication links from the mobile terminal to any other base stations is removed. As such, the Control Node is able to supervise each student scheduled class time and his presence within the school premises.

At the class scheduled start time the Control Node may introduce the "Quiet Class Periods" in each classroom by blocking all non-emergency incoming and outgoing communication from the student's mobile terminals and an indication may be given to the mobile terminal that it is in a localized silence zone. The indication may include a request that the mobile device operate in a silent mode, information about making outgoing calls, information about receiving incoming calls, or a combination of these. Procedures for incoming voice calls to the mobile device may be different for different priority levels.

When an incoming call from a outside caller is received during the class silent period, the access point base station (HNB-GW) delays sending the page message, indicating the device is in a silent zone and instructing on procedures to place an immediate emergency call to this particular device. If such procedure is performed, the call is allowed and the mobile terminal is paged.

To provide such functionality, several types of information in form of lists, tables, parameters, etc. must be stored for the use by various parts of the system. Furthermore, such information must be protected against unauthorized modifications by secure login privileges and passwords.

First such information consisting list of all students, their mobile terminals IDs, and their home femto-cells IP addresses and their mobile terminal IDs.

A second such information defines association among the mobile terminals (e.g. defining which access terminals belong to which mCSG, and the mFAP for an inbound route and authorizing a mobile terminal to access the mobile femto-cell components belonging to this group.

A second such information defines association among the mobile terminals (e.g. defining which access terminals belong to which mCSG, and the mFAP for an outbound route and authorizing a mobile terminal to access the mobile femto-cell components belonging to this group.

A forth such information contains the group association among mFAPs defining each mFAP route and the handover schedule for mobile terminals belonging to it's Closed Subscriber Group.

A fifth such information, containing the group association of wireless terminals IDs with the scheduled classes, class location.

A sixth such information containing a list of student's legal guardians and their emergency phone numbers and IP addresses.

A seventh such information containing list of pre-authorized Alert Cancellation Messages.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes", "has" or "having" are used in either the detailed description or the claims, such terms are intended to be inclusive in a manner similar to the term "comprising" as "comprising" is interpreted when employed as a transitional word in a claim.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented Those of skill in the art would understand that information and signals may be represented using any of a variety of different technologies and techniques. For example, data, instructions, commands, information, signals, bits, symbols, etc. may be referenced throughout the above description by other means.

Those of skill would further appreciate that the various illustrative logical blocks, modules, and algorithmic steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

We claim:

1. A mobile femto-cell providing localized communication within a moving vehicle comprising:
    a primary radio interface to provide services within the mobile femto-cell coverage area;
    a secondary radio interface to communicate with a macro-cell and a service provider core network, wherein the primary radio interface is configured to provide service to a multiplicity of selected users inside the vehicle; and wherein the secondary radio interface is configured to carry communication intended for said multiplicity of selected users inside a multi-user packet; and wherein dedicated user traffic of said multiplicity of selected users received on the primary radio interface is aggregated into a multi-user packet by a mobile femto-cell media access control (MAC) layer before transmission to the macro-cell via the secondary radio interface; and wherein said mobile femto-cell MAC layer provides identification of a selected user packet within a multi-user packets transmitted on the secondary radio interface;

wherein an aggregated multi-user packet received from the macro-cell on the secondary radio interface containing user traffic intended for the multiplicity of selected users inside the vehicle is de-aggregated by the mobile femto-cell MAC layer into single user packets before said single user packets containing the user traffic received from the macro-cell on the secondary interface are sent to the multiplicity of selected users via the primary radio interface.

2. The mobile femto-cell of claim 1, wherein one selected user of the multiplicity of selected users completes handover between a macro-cell and the mobile femto-cell, the mobile femto-cell sends a message to the macro-cell on the secondary radio interface indicating presence of the selected user of the multiplicity of selected users; and wherein upon receiving said message, the user traffic intended for the selected user of the multiplicity of selected users is included in the multi-user packet transmitted on the secondary interface, while said user traffic previously transmitted by the macro-cell on the secondary radio interface is terminated.

3. The mobile femto-cell of claim 1 wherein said primary radio interface supports one or multiplicity of wireless cellular radio access technologies.

4. The mobile femto-cell of claim 1 wherein said secondary radio interface operates in the same or different cellular radio frequency channel as the primary radio interface.

5. The mobile femto-cell of claim 1 wherein said secondary radio interface uses same or different cellular radio access technology as the primary radio interface.

6. A method of providing wireless communication inside a vehicle comprising the steps of:
    signaling the presence of a selected user presence inside the vehicle to a macro-cell;
    receiving single user packets from a multiplicity of users located inside the vehicle using a mobile femto-cell primary radio interface;
    aggregating the single user packets into a multi-user packet in a mobile femto-cell media access control (MAC) layer before transmission to the macro-cell;
    wherein the aggregating further comprises providing, by the mobile femto-cell MAC layer, identification of a selected user packet within the multi-user packet transmitted on the secondary radio interface;
    transmitting said multi-user packet to the macro-cell on a mobile femto-cell secondary interface;
    receiving multi-user packets from a macro-cell using the mobile femto-cell secondary radio interface;
    de-aggregating, at the mobile femto-cell MAC layer, said multi-user packets received from the macro-cell into individual user packets; and
    transmitting said individual user packets containing user traffic to the multiplicity of users inside the vehicle on the mobile femto-cell primary radio interface.

7. The mobile femto-cell of claim 1, wherein upon one selected user of the multiplicity of selected users completes handover between the mobile femto-cell and the macro-cell, the mobile femto-cell sends a message to the macro-cell on the secondary radio interface informing absence of the selected user of the multiplicity of selected users; and wherein upon reception of said message, current communication to the selected user of the multiplicity of selected users is transferred to the macro-cell dedicated radio interface while said user traffic transmitted on the secondary radio interface is terminated.

* * * * *